United States Patent Office 3,262,643
Patented July 26, 1966

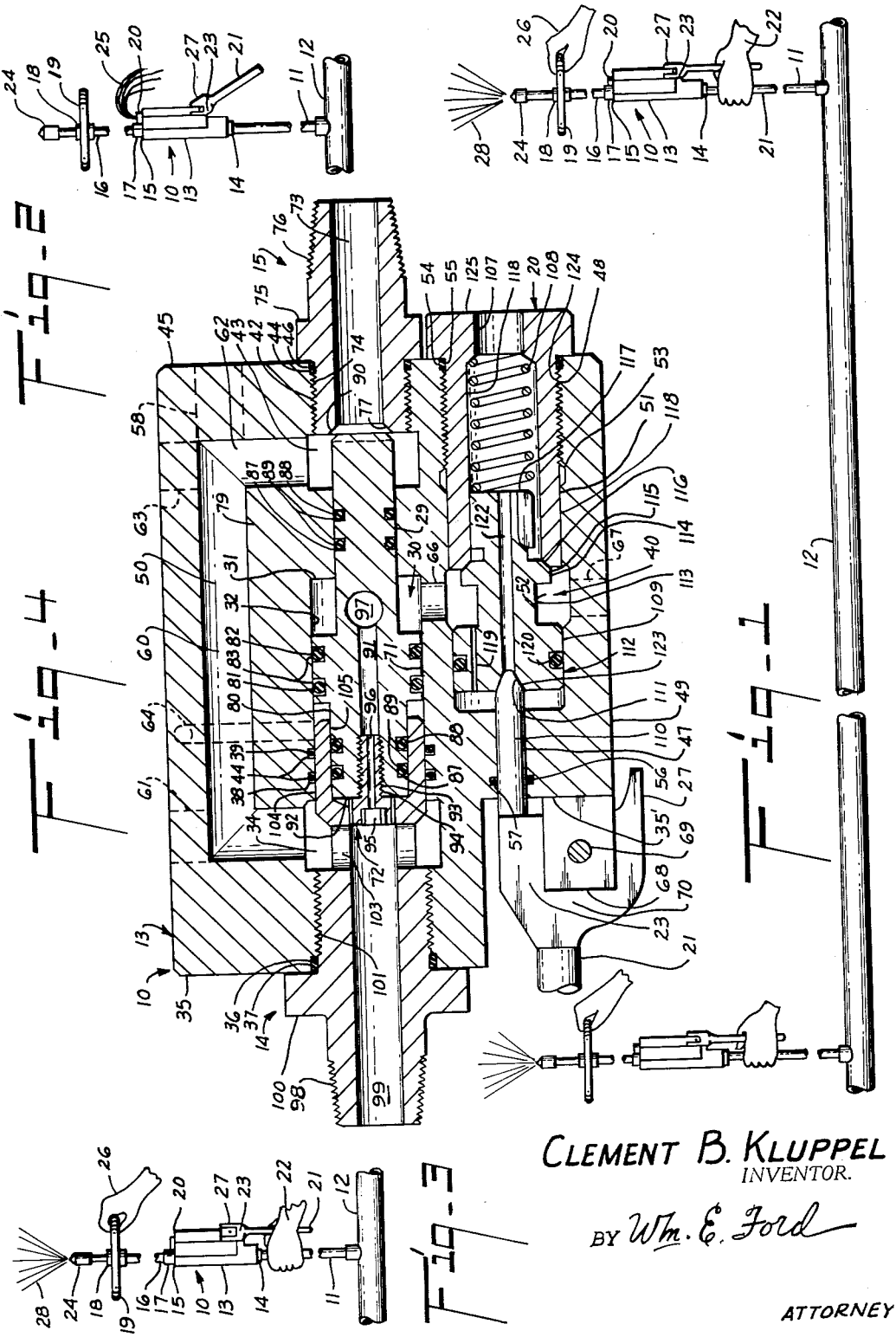

3,262,643
HAND HELD TWO-WAY VALVE FOR DIVERTING FLUID WHILE MAINTAINING CONSTANT LINE PRESSURE
Clement B. Kluppel, Houston, Tex., assignor to Ka-Cy Manufacturing Co., Inc., Houston, Tex., a corporation of Texas
Filed Mar. 31, 1964, Ser. No. 356,206
5 Claims. (Cl. 239—11)

This invention relates to method and structure for diverting high pressure fluid, as employed in jet cleaning of objects, to low pressure discharge when not in service, while insuring constant effective line pressure at a plurality of operative stations.

It is a primary object of this invention to provide valves and methods of use whereby a station operator can selectively divert high pressure operative fluid, within a valve, to safe low pressure discharge when not operating, while the line fluid pressure at other stations remains unchanged.

It is another object of this invention to provide methods of fluid diversion, and a two-way valve, manually operable at high pressure fluid cleaning stations having discharge nozzles of predetermined orifice, the valves being shiftable from full line force delivery to divert the fluid through corresponding orifice therein, to low pressure discharge, line fluid pressure remaining constant.

It is also a further object of this invention to provide a method of fluid diversion and station valve means therefor whereby substantially minimum effort is required to set in motion structure within the station valve means to cooperate with the fluid therein to divert the fluid to low pressure discharge.

It is also an important object of this invention to provide a method of selectively diverting the delivery of fluid at any station from high pressure directed delivery to low pressure discharge, the line fluid pressure remaining constant.

Other and further objects will be apparent when the specification is considered in connection with the drawings, in which:

FIG. 1 shows two valves which are embodiments of this invention installed upstream from the station discharge nozzles, on a high pressure fluid delivery line at spaced apart stations, both valves being indicated as delivering fluid under full line delivery conditions;

FIG. 2 shows the right valve shown in FIG. 1 switched to deliver fluid at low pressure;

FIG. 3 shows that the left valve shown in FIG. 1 continues to deliver fluid at the same high pressure, without increase or decrease, while the right valve, as shown in FIG. 2, is released to deliver fluid at low pressure, fluid at station L delivering responsive to the same line pressure as before; and FIG. 4 is a sectional view through either the right or left valve shown in FIG. 1, such view showing the construction and thereby the operation of the invention in detail.

Referring now to the drawings in which like reference numerals are applied to like elements in the various views, a valve 10 is shown at a right station R in FIG. 1 installed upon a conduit 11 from a high pressure fluid line 12, as a water line, under such power, not shown, as to deliver liquid, as water at a plurality of stations at pressures as high as 7,000 p.s.i. at each station.

A corresponding valve 10 is shown at a left station L in FIG. 1, and correspondingly installed upon a conduit 11 from the line 12 to deliver high pressure fluid at the same pressure as the fluid delivered at station R.

The valve body 13 of each valve 10 has an inlet member 14 assembled therewith onto which the conduit 11 is connected, and a discharge nozzle 15 is also assembled with the valve body 13 onto which a delivery conduit 16 is connected having a nipple 17 therein and connected outwardly into the hub 18 of a handwheel 19 into which is connected a discharge nozzle 24 from which the fluid is finally ejected at great pressure, as for cleaning purposes.

Each valve body 13 has a handle 21 pivotally mounted thereon and when the left hand 22 of an operator, as shown in FIG. 1, grasps a handle 21 together with the adjacent conduit 11, the inner prong or portion 23 of the contact end of the handle 21 urges a plunger pin, (not shown in FIGS. 1–3, inclusive, and to be hereinbelow described in connection with FIG. 4), to seat within the valve body 13. This insures that the high pressure delivery of fluid must continue, and prevents the high pressure fluid to be needled within the valve body 13, and ejected through a relief nozzle 20 and expended as low pressure fluid 25, as indicated in FIG. 2.

While the high pressure fluid flows through a valve 10, the operator directs the discharge nozzle 24 at whatever object is to be worked upon. In the drawings a conventional handwheel 19 is shown held by the right hand of the operator, however any other directive means would serve as well.

It is possible however for an operator to release his left hand grasp of the handle 21 and conduit 11, whereby the handle 21 may take the position shown in FIG. 2, so that the plunger pin, not shown in FIGS. 1–3, as set forth hereinabove, but operative within the valve body 13, may be unseated to permit the two-way valve 10 to shift, with its high pressure control plunger, not shown in FIGS. 1–3, closing the discharge nozzle 15, while the fluid is needled through an orifice within the valve body, not shown in FIGS. 1–3, to pass out the relief nozzle 20 as low pressure fluid 25, as hereinabove described.

When this occurs the outer prong 27 of the handle 21 strikes the side of the valve body 13 as a stop, and the handle 21 extends at the angle shown at station R, FIG. 2. In this view the hands of the operator are not shown, and it may be assumed that the operator has departed.

When a station is taken off high pressure operation nevertheless the line force exerted at each of the other stations operative off the line 12 remains the same. For instance, the force that has heretofore been expended at station R to eject high pressure fluid is now required to needle the high pressure fluid through a pressure reducing orifice, not shown in FIGS. 1–3. Thus, the fluid stream 28, as indicated at both stations L and R in FIG. 1, and at the station L shown in FIG. 3, is designed to indicate that the ejected fluid is at the same high line pressure.

Referring now in detail to FIG. 4, a valve 10 as shown in FIGS. 1–3, inclusive, is shown as comprising a valve body 13 which provides a first machined axis 30 comprising a plunger valve chamber and high pressure fluid passage passing collectively axially through the body 13. Such axis 30 may be formed as follows: First, the body 13 is bored through, a portion of such bore remaining after subsequent machining to provide a guide bore 29. Then from its left end face 35 the body 13 is counterbored to provide a closure shoulder 31 for the inner portion of the counterbore, such counterbore being designated by reference numeral 32, which communicates with the guide bore 29; the outer part of such counterbore being tapped to provide a threaded counterbore 33. Also, between the threaded counterbore 33 and the counterbore 32 the body 13 is underreamed to provide an annulus or space 34. Additionally, the body 13 is further counterbored from the left end face 35 to provide a groove 36 for a sealing O-ring 37. Also, the body 13 has two closely spaced apart grooves 38, 39, underreamed in the counterbore 32, with the outer groove being closely spaced inwardly from the outer end of such counterbore 32, such grooves being for the purpose of receiving sealing O-rings 41 therein.

The body 13 may then be counterbored from the right end face 45 and the outer portion of the counterbore tapped to provide a threaded counterbore 42, while the inner portion of such counterbore is underreamed to provide an underreamed annulus or space 43 which communicates with the guide bore 29. The body 13 is further counterbored from the right end face 45 to provide a groove 44 for a sealing O-ring 46. This completes the first machined axis 30.

The body 13 has a second machined axis 40 therethrough parallel to the first axis 30, which comprises a high pressure relief and control passage which collectively extends axially through the body 13 and which is formed as follows:

First, a relatively small diameter bore is made through the body 13, the left end portion of which remains after subsequent machining, to provide a plunger pin bore 47 for a plunger pin, not shown in FIGS. 1–3, inclusive, but described as to function in connection with the hereinabove description of such figures, and to be further described hereinbelow. After this first step the body 13 is then counterbored from the right end face 45 and the right end portion thereof is tapped to provide a threaded counterbore 48, a smooth counterbore 51 immediately inwardly thereof, and further inwardly a smooth counterbore 49, with the space between counterbores 49 and 51 being underreamed to provide an underreamed annulus or space 52. Also, a further underreamed and countersunk space 53 is provided between the threaded counterbore 48 and the outer smooth counterbore 51. Additionally, the body 13 is counterbored from its right end face 45 to provide a groove 54 for a sealing O-ring 55. Also, the plunger pin bore 47 is underreamed at a location spaced shortly from the shortened body left end face 35' to provide a groove 56 for a sealing O-ring 57.

Also, the body 13 has a by-pass passage 50 provided therein, which includes a by-pass bore 60, parallel to and spaced from the passages 30 and 40, the bore being drilled through the right end face of the body and the outer end thereof then plugged, as by a plug 58. Then a radial bore 59 is drilled into the body 13 to include the inlet end of the by-pass bore 60 and to communicate with the underreamed annulus or space 34 of the passage 30, the outer end of the radial bore 59 then being plugged by a plug 61. Also, a corresponding radial bore 62 is provided to include the opposite end of the by-pass bore 60 and to communicate with the underreamed annulus or space 43 of the passage 30, the outer end of such radial bore 62 then being plugged by a plug 63.

Also, a radial bore 64 is provided to pass through the body 13 to communicate with the counterbore 32 for a purpose to be hereinbelow described. An additional radial bore 66 is drilled to pass through the underreamed space 52 to establish communication between such underreamed space 52 and the central smooth body counterbore 32, and in substantially the same longitudinal location as the radial bore 65, the outer part of such bore 66 being closed by a plug 67. Additionally, the body 13 has two slightly spaced apart lugs or ears 68 thereon to supply journals or supports for a pivot pin 69, on which pivots the contact end 70 of the handle 21.

The machined axis or passage 30 has disposed therein successively from right to left, a nozzle or discharge member 15, a valve element and plunger 71, including an orifice member 72 assembled into the left end thereof, and an inlet member 14.

The discharge or nozzle member 15 has a discharge bore 73 axially therethrough and provides externally a threaded inner end 74 for engagement with the threaded counterbore 42 of the body 13. Also a central flange 75 is included to shoulder against the right end face 45 of the valve body 13 and to enclose the O-ring 46 in sealing engagement between body 13 and nozzle member 15. Additionally, the nozzle member 15 includes an outer end portion 76 through which fluid to be jetted is discharged, such other end portion being externally taper threaded for engagement with any nozzle extension or continuation, such as the conduit 16, shown in FIGS. 1–3, through which the high pressure fluid is delivered to be passed on for further discharge. The inner end of the discharge bore 73 is countersunk to provide a tapered valve seat 77 for a purpose to be hereinbelow described.

The plunger 71 has a central flange portion 78 and is of reduced diameter on either side of the flange 78 to provide a lesser diameter shank portion 79 to the right thereof and a shank portion 80 to the left thereof of greater diameter than the right shank portion 79, but of lesser diameter than the flange 78, and for a purpose to be hereinbelow described. The flange portion 78 is of diameter to be passed in assembly through the internally threaded counterbore 33 of the body 13 with its flange 78 to be positioned to slide in the counterbore 32. Two longitudinally spaced apart grooves 81, 82 are provided in the periphery of the flange 78 to receive sealing O-rings 83 which bear sealably against the smooth counterbore 32 within the body 13 so that the flange 78 carries means to seal against leakage across the flange periphery.

Also, the plunger 71 has annular grooves 84, 85 in its left shank 80 to carry sealing O-rings 86, for a purpose to be hereinbelow described. Additionally, the plunger 71 has annular grooves 87, 88 therein in its right shank 79, to carry sealing O-rings 89 which slide sealably in the body guide bore 29. Furthermore, the plunger 71 has its right end tapered to provide a tapered valve element 90 to seat on the aforesaid tapered valve seat 77 of the discharge nozzle 15. The plunger 71 has a bore 91 thereinto from its left end face 92 and larger diameter ports 97 extend radially outwardly from the inner end of the bore 91 through the periphery of the plunger right shank 79 to communicate with a space S provided in the right end of the counterbore 32, as isolated by the plunger flange 78.

The outer portions 93 of the plunger bore 91 is internally threaded to threadably receive therein the externally threaded shank 94 of the orifice member 72 which has a socket head 95 to receive a socket wrench, not shown, by which the orifice members 72 may be installed or removed. The orifice member 72 has an orifice 96 of a diameter much smaller than the diameter of the plunger bore 91 into which the orifice member 72 is installed. Orifice members 72 having different orifice diameters are constructed with the same external dimensions and construction for purposes of interchangeability so that orifice diameters may be selected as to orifice diameter to suit varying requirements in operation.

The inlet member 14 provides an outer end portion 98 which is externally taper threaded for connection to the conduit 11 from the power line 12, shown in FIGS. 1–3, inclusive, which supplies high pressure fluid into the inlet member bore 99. The inlet member 14 is enlarged to provide a flange 100 just inwardly of the outer end portion 98 and such flange 100 seats against the left end face 35 of the body 13 to sealably enclose the O-ring seal 37 when an externally threaded central portion 101 of the inlet member 14 is threaded full up in the internally threaded counterbore 33 of the body 13.

The inlet member 14 includes a bore 99 therethrough, and inwardly of the central portion 100 the inlet member 14 includes a reduced diameter portion 102 providing ports 103 which extend radially outwardly from the bore 99 to communicate with the annulus or space 34 which in turn communicates with the inlet bore 59 into the longitudinal by-pass 60 of the passage 50.

The inlet member 14 includes an inner end portion 104 inwardly of the reduced diameter portion 102, which has a smooth outer diameter equal substantially to the thread root diameter of the externally threaded central portion 101. The bore 99, which extends axially through the inlet member 14 in initial machining, is counterbored and countersunk from the right end thereof to provide a smooth counterbore 105 into such right end, and a short tapered countersunk surface 106 at the left end of such counterbore 105 which joins the bore 99. The inner end portion 104 of the inlet member 14 bears sealably against the O-rings 41 to seal against leakage of by-passed high pressure fluid inwardly into an annular space or chamber T about the left shank 80 of the plunger 71 and defined by the inner surfaces of the inlet member inner end portion 104, the plunger flange 78, and the surface of the counterbore 32.

However, in case of leakage in any event, because of the high pressure of the fluid entering the valve 10, the fluid cannot build up in the space T and resist plunger movement since such space communicates with the bore 64 which vents to the atmosphere exterior of the valve body 13. The entering high pressure fluid thus is channelized to flow from the inlet member bore 99 out the ports 103 into the underreamed annular space 34, to enter the by-pass passage 50 by way of its radial bore 59, and down the longitudinal by-pass bore 60 and from the downstream end of the by-pass bore 60 to flow through the radial bore 62 and into the annular underreamed space 43 to maintain the plunger 71 urged to the left and unseated while the fluid passes out the discharge bore 73 when the plunger valve element 90 is unseated.

The bore 47 of the machined axis or passage 40 has a plunger pin 110 terminating inwardly in a tapered valve element 111 to seat in a valve seat 123 provided in the left end of a bore 122 through a relief spool valve 109, as the inner prong or portion 23 of the contact end 70 of the handle 21 bears on the outer end face of the pivot pin 110 when the handle 21 and conduit 11 are together held manually, as shown in FIGS. 1, 3 and 4.

The spool shaped relief valve member 109 has a valve head or flange 112 as the left member thereof which has a groove 120 centrally therein to carry a sealing O-ring 121, and which is of outer diameter to be passed into the first machined axis or high pressure relief and control passage 40 by entering its head or flange 112 to clear the threaded counterbore 48 into the right end face 45 of the body 10, such head then to pass by the smooth counterbore 51 and the annular space 52 to sealably slide in the smooth counterbore 49.

A bleed passage 119, spaced from the axis of the spool valve 109, passes through the head or flange 112 thereof to communicate with a sealed chamber U which is provided by the O-ring 121 in the counterbore 49 to the left of the flange 112 when the handle 21 is held in the position shown in FIGS. 1, 3 and 4 to seat the plunger pin end 111 in the tapered valve seat 123.

Intermediate its ends the spool valve 109 has a reduced diameter portion 113 and to the right thereof it has a flange 114, which is of lesser cross-sectional area than that of its valve head flange 112, and which provides at its outer end a tapered surface which comprises that valve element 115 which is the immediate part of the flange 114 which seats upon a countersunk surface provided as the innermost or valve seat portion 116 of the valve seat and relief discharge nozzle 20, when the handle 21 is held, disposed as shown in FIGS. 1, 3 and 4.

The spool valve 109 extends outwardly beyond the valve seat flange 114 and terminates in a fluked or longitudinally slotted outer end 117. This outer end 117 bears against the inner end of a spring 108 within an enlarged counterbore 118 of the valve member and ejection nozzle 20, which counterbore 118 communicates outwardly with the discharge bore 107 through which fluid leaves the member 20.

21 free, the spring 108 will urge the spool valve 109 off

On the other hand, if the assembler leaves the handle its seat and to the left until the prong 27 strikes the body 13 as indicated in FIG. 2, and by the arrows in FIG. 4.

In this case during assembly the flange valve element 115 is unseated from the valve seat 116 on the end of the nozzle member 20 and the valve body 13 remains open through the fluid ejection bore 107, counterbore 118 and space 52.

*Operation*

Starting from the point when a station, as L or R, is first assembled to a supply line 12 under high pressure, and a valve, not shown, in the conduit 11 is turned on to let the full force of line pressure act upon the water supplied into the conduit, then, when this occurs, as long as the operator does not grasp the handle 21 and conduit 11, as shown in FIGS. 1, 3 and 4, the highly pressurized water will act upon the left end of the plunger 71 and urge it seated to the right against the valve seat 77. The plunger 71 will remain seated under these circumstances since the cross-sectional area of the shank 80 is greater than that of the shank 79.

The incoming water will also pass through the orifice 96 and bore 91 and ports 97, the bore 66, and pass out through the space 52, counterbore 118, and discharge bore 107. This condition will continue, and after the space downstream from the orifice 96 is filled, water will pass out the ejection bore 107 as limited by the pressure thereof with relation to the cross-sectional area of the orifice 96.

As long as the initial manual effort is not exerted to move the plunger pin 110 inwardly to seated position and to seat the spool valve element 115 on the valve seat 116 the valve 10 can be operated with safety, as the line force that would ordinarily be employed in jetting the discharge fluid to do its work at tremendously high pressures, is all being expended to urge the fluid, as water under high pressure, through the orifice 96.

The safe continuance of this condition is assured by only providing say ⅛″ or 1/16″ difference in the diameters of the shank 80 and the shank 79 since such a difference is ample to insure that a very adequate differential in force or fluid pressure acts in direction to maintain the plunger 71 unseated.

Now, if the handle 21 is grasped together with the conduit 11, as shown in FIGS. 1 and 3, the flange head 112 is urged to the right by the plunger pin 110 to seat the flange valve element 115 against the valve seat 116. This can be done with a minimum effort since the water downstream of the orifice 96, in direction of the discharge 107, is substantially pressure relieved with the valve element 115 unseated. Now, as this valve element 115 continues to be held seated, the fluid pressure downstream of the orifice 96 in direction of the discharge 107 begins to build up and urges the plunger flange 78 to the left to unseat the plunger valve element end 90 from its seat, since the cross-sectional area of the flange 78 is greater than the cross-sectional area of the shank 80. As this occurs, the chamber T to the left of the plunger flange 78 remains open to the atmosphere through the vent bore 64 and no opposing pressure can be built up therein. This leftward movement of the plunger 71 continues until the left end face 92 of the shank 80 contacts the inner end portion 104 of the inlet member 14, at the junction of the counterbore 105 and tapered surface 106, as shown in FIG. 4. Also, the water is urged through the bleed passage 119 to fill the chamber U to the left of the spool valve 109, and in time the water pressure in chamber U and the water pressure in the space to the right thereof in the machined axis 40 and thereabove to the right of the piston flange 78 and downstream of the orifice 96 is neutralized. The high pressure fluid continues to flow by way of the by-pass passage 60 to the bore 73 from which it is passed onwardly through conduit 16 to be jetted at very high velocity resulting from pressure acting against an orifice in the ejection nozzle 24, such orifice being the same size as the orifice 96 in the valve 10.

Thereafter, when it is desired to close the station and the handle 21 is released, as shown in FIG. 2, the pressure of fluid in the chamber U will unseat the plunger pin 110, and move the spool valve 109 to the right to recreate the chamber U while the O-ring 57 seals against the loss of pressure fluid out through the plunger pin bore 47 and insures that the fluid pressure will urge the plunger pin 110 outwardly.

When the plunger pin tapered end or valve element 111 unseats from the valve seat 123, the spring 108 can urge the spool valve 109 to the left to evacuate the chamber U by forcing the fluid to pass down the spool valve bore 122 and out the counterbore 118 of the discharge nozzle 20, to be ejected out the discharge bore 107.

Also, the pressure fluid that has filled the plunger bore 91 and plunger ports 97, and the space S and the connection bore 66, and the annular space 52, can pass to the right of the valve element 115 provided by the spool valve flange 114 and into the relief discharge nozzle counterbore 118 to be ejected through the discharge bore 107.

As the fluid pressure in the space downstream of the orifice 96 in direction of the discharge nozzle discharge bore 107 falls toward atmospheric as this space is being evacuated due to the release of the handle 21, the high pressure fluid forces the plunger 71 to the right due to the differential in cross-sectional area between the shank 80 and the shank 79, and the plunger valve element end 90 is seated to close off further fluid delivery down the conduit 16 to the delivery nozzle 24.

Very shortly after the handle 21 has been released and the fluid which has heretofore filled this space is quickly diminished by evacuation, a condition comes to exist where there is a constant amount of fluid passing through the space downstream of the orifice 96, as limited by the cross-sectional area of this orifice with relation to the line pressure in the main line 12.

A noticeable feature to be observed is that, with an orifice in the delivery nozzle 24 of a predetermined cross-sectional area, and an orifice of the same area within the valve 10, the ratio of the volumetric rate of fluid delivered when jetting to the volumetric rate of fluid expended when the handle 21 is released with full line pressure on a station, may be calculated by a formula by which line pressure and atmospheric pressure enter according to physical laws, the orifice area factor then becoming a constant.

It should be considered that inherent danger can exist in the case of a fluid delivery line of capacity to deliver fluid under great pressure, to a number of stations, when the closing down of operation at one station can cause an additive distribution of the line pressure expended at a closed down station, among stations remaining in operation. In the case of a power line delivering fluid at 7,000 p.s.i. at two stations, as an exaggerated example, with the apparatus at each station so adapted that a station could be closed so as to require no further line pressure exerted thereat, then in logical theory, and not considering friction loss through increase of line pressure, it follows that the pressure at the remaining station could be dangerously increased.

Thus, it can be seen that in a main high pressure fluid line, adapted to deliver fluid to each station at the maximum safe high pressure capacity of the station, if no provision is made at each station to continue utilizing the line force expended at that station after it is closed down from high pressure delivery, such force will be restored to the line to increase the pressure proportionately as divided by the stations remaining operative, with the result that pressures can be increased at a remaining station or stations beyond safe operating limits.

It should thus be almost imperative that each station should have quickly responsive control means therein almost automatically set effective to insure the closing down of high pressure jetting operations without causing any more than very minimum changes in the pressures exerted at those stations which remain operative.

The structure hereinabove disclosed has proven to be well adapted to carry out the purposes of the invention. However, it is obvious that other structures may also serve to carry out the functions, methods, and objects, as set forth, and therefore it can be stated that structures other than those shown are considered as long as such may fall within the broad spirit of the invention and within the broad scope of interpretation claimed for and merited by the appended claims.

What is claimed is:

1. A two-way valve comprising a body providing a main axial cavity extending from inlet into outlet from said cavity, a plunger having successively sealably slidable in said main axial cavity a forward shank, a plunger flange of larger diameter than said forward shank, and a rear shank of lesser diameter than said forward shank, terminating in a plunger valve element, whereby said main axis cavity is divided into a forward chamber and an after chamber, a vent from said forward chamber outwardly through said body, a high pressure fluid by-pass flow passage in said body from said main axial cavity upstream, to said main axial cavity downstream of said plunger and providing a plunger valve seat in said outlet, a passage in said plunger from forward end to communicate with said rear chamber and providing an inlet orifice thereinto, a relief axial cavity extending through said body and providing a spool valve seat therein, a spool valve in said relief axial cavity having an axial passage therethrough providing forwardly a control pin valve seat, said spool valve including successively a spool head forwardly sealably slidable in said relief axial cavity, a reduced diameter portion to provide a fluid space therearound, and a flanged spool valve element of lesser diameter than said spool head, said spool head having a bleed passage from said space forwardly therethrough, a connection port between said rear chamber and said space, a control pin sealably slidable forwardly in said relief axial cavity with inner end comprising a valve element, and a handle held manually to hold said pin seated rearwardly thereby to seat said spool valve whereby fluid pressure differential maintains said plunger unseated for high pressure fluid delivery through said main axial cavity outlet, upon handle release fluid pressure unseating said pin and fluid pressure differential seating said plunger and unseating said spool valve so that high pressure fluid is urged through said orifice to pass as pressure relieved fluid out of said relief axial passage.

2. A two-way valve as claimed in claim 1 which additionally includes a spring to yieldably urge said spool valve forwardly.

3. Apparatus including a two-way valve as claimed in claim 1, and additionally a jet nozzle downstream of said two-way valve having an orifice therein of cross-sectional area of said inlet orifice.

4. Apparatus including a two-way valve as claimed in claim 1, and additionally a jet nozzle downstream of said two-way valve having an orifice therein of cross-sectional area of said inlet orifice, and a manually directable means between said jet nozzle and said two-way valve to be held to direct the jetting action of said apparatus.

5. A two-way valve as claimed in claim 1 in which said handle is pivotally mounted on said body and includes a stop prong spaced from the pin contacting part thereof to be pivoted to contact said body as a stop when said handle is released.

References Cited by the Examiner

UNITED STATES PATENTS

| | | | |
|---|---|---|---|
| 2,355,882 | 8/1944 | Malsbary et al. | 239—536 |
| 2,616,450 | 11/1952 | Legge et al. | 251—43 |
| 2,753,664 | 7/1956 | Garver | 251—33 |
| 2,805,038 | 9/1957 | Towler et al. | 251—29 |
| 2,918,072 | 12/1959 | Boler | 251—29 |

EVERETT W. KIRBY, *Primary Examiner.*